United States Patent [19]

Schwieker

[11] Patent Number: 4,489,428

[45] Date of Patent: Dec. 18, 1984

[54] X-RAY SPOT-FILM DEVICE

[75] Inventor: Horst H. Schwieker, Hamburg, Fed. Rep. of Germany

[73] Assignee: U.S. Philips Corporation, New York, N.Y.

[21] Appl. No.: 385,241

[22] Filed: Jun. 4, 1982

[30] Foreign Application Priority Data

Jun. 6, 1981 [DE] Fed. Rep. of Germany ....... 3122723

[51] Int. Cl.$^3$ .............................................. G03B 41/16
[52] U.S. Cl. ...................................... 378/176; 378/181
[58] Field of Search ........................ 378/181, 175, 176

[56] References Cited

U.S. PATENT DOCUMENTS 3,848,134 11/1974 Gieschen et al. .................... 250/471
3,976,887 8/1976 Holzermer ........................... 378/181
3,986,034 10/1976 Wittkopp ............................. 378/181

Primary Examiner—Craig E. Church
Attorney, Agent, or Firm—Marc D. Schechter

[57] ABSTRACT

The invention relates to an X-ray spot-film device comprising two sliding-fixtures. The sliding-fixtures serve inter alia, for the measurement of a film cassette. The measurement of the dimensions of the cassette is performed by means of a single strap which is coupled to the sliding fixtures. The effect of the cassette height on a measurable dimension of the strap differs from the effect of the cassette width. Consequently, the measurement also determines whether the cassette has been inserted upright or sideways.

15 Claims, 2 Drawing Figures

X-RAY SPOT-FILM DEVICE

BACKGROUND OF THE INVENTION

The invention relates to an X-ray spot-film device. The device comprises a cassette carriage with two sliding fixtures for holding and sensing the cassette. The opening of the first sliding fixture is determined by the height of the cassette while the opening of the second-sliding-fixture is determined by the width of the cassette. The device also comprises a strap which is coupled to the sliding fixture. The strap has a measurable dimensions whose value is determined by the dimensions of the cassette. The X-ray spot film device further includes a device for detecting the value of the measurable dimension.

It is important to know the cassette dimensions when making X-ray exposures in an X-ray spot-film device. This is because these dimensions determine the movement path of the cassette carriage to the exposure position, the angle of aperture of the primary radiation beam for the primary radiation beam diaphragm (which is automatically adjustable in dependence on the cassette format), and the indication for the user.

In an X-ray spot-film device of the kind described above which is known from German Offenlegungsschrift No. 1,858,825, there are provided two straps for determining the cassette dimensions. Each of these straps is coupled to one of the two sliding fixtures and each strap has a measurable dimension whose value is determined by the height and the width of the cassette, respectively.

Therefore, there are also provided two devices for detecting the values of the measurable dimensions. Each detecting device comprises a motor for follow-up control. However, the detecting devices may alternatively comprise measuring potentiometers which are coupled to the straps.

The dimensions of cassettes having nonstandardized formats can be determined by such detecting devices. However this is not really necessary because standardized cassettes (DIN 6832) are usually used.

SUMMARY OF THE INVENTION

It is an object of the invention to construct an X-ray spot-film device of the kind described above so that the dimensions of standard cassettes are sensed in a less complex manner.

This object is achieved in that the strap consists of a single strap which is coupled to the first and to the second sliding fixtures. The coupling is constructed so that in reaction to the opening or closing of one sliding fixture the measurable dimension of the strap is shifted n times further than in reaction to a corresponding opening or closing of the other sliding fixture, n being unequal to 1.

According to the invention, the cassette circumference k is measured in a quasi-weighted manner, that is to say a measurement $k = a \cdot h + a \cdot nb$ or $k = a \cdot n \cdot h + a \cdot b$ is performed, in which h is the height of the cassette, b is the width of the cassette and a is a proportionality factor. In the case of standard cassettes, the cassette format can be directly determined from the value k when n is suitably chosen; only one device (for example, a potentiometer) is then required for detecting the value of the measurable dimension.

In a further embodiment according to the invention, n is equal to 2. Such a coupling between the two sliding fixtures and the straps can be comparatively simply realized (for example, by using pulleys for guiding the loop). When the customary standard cassettes are used (13×18, 18×24, 24×24, 24×30, 30×30, or 35×35), values of k are obtained which differ by at least 60 mm when a is chosen to be equal to 1. Because the value of the measurable dimension changes linearly with the value k, the electrical signals which are proportional to the value of the measurable dimension, and which are generated, for example, by means of a potentiometer, can be simply assigned to represent the various formats. The format of the cassette can be identified by means of an evaluation circuit. The format can then also be detected whether the cassette has been inserted with the upright or the sideways (for example, 18×24 upright of 18×24 sideways).

In a further embodiment according to the invention, the first sliding fixture comprises two sliding members which are uniformly movable in opposite directions. The second sliding fixture comprises one sliding member which cooperates with an abutment (known per se from German Offenlegungsschrift No. 1,958,825). The strap is guided vertically about a guide on one of the two sliding members of the first sliding fixture. The strap is guided horizontally about a guide on the sliding member of the second sliding fixture means.

In this embodiment of the invention, the position, of the sliding member of the first sliding fixture which has the guide, changes according to half the height of the cassette. The position of the sliding member of the second sliding fixture is shifted according to the width of the cassette.

Thus, when a cassette having a height of 18 cm is replaced by a cassette having a height of 30 cm, the position of the sliding member having the guide is shifted over half the difference between these two heights, i.e. over 6 cm. However, when a cassette having a width of 18 cm is replaced by a cassette having a width of 30 cm, the position of the sliding member of the second sliding fixture is shifted over 12 cm. Thus, without using an additional mechanical transmission device, n equals 2.

In a further embodiment of the invention, one end of the strap, or a movable roller via which the relevant end is guided to a fixed point, is coupled to a tension spring. The spring thus serves to tension the loop and hence also to tension both sliding-fixtures.

In a further embodiment according to the invention, the sliding members of the first sliding fixture are slidable along a vertical member which is connected to the cassette carriage. A motor which acts on the strap is provided for height adjustment of the cassette. In that case the strap also serves for height adjustment of the cassette which is required when, for example, each time one exposure is to be made on the upper and on the lower half of the film in the cassette.

The strap can be guided so that a lateral displacement of the cassette carriage has no effect on the value of the measurable dimension. However, in view of the finite friction between the strap and the various components whereby it is guided, a shift in the value of the measurable dimension might occur during the sliding of the cassette carriage. This is precluded in a further embodiment of the invention in which there is provided means for locking the device for detecting the value. The locking means locks the device for detecting the value when the cassette carriage is displaced on the horizontal direction.

DESCRIPTION OF THE PREFERRED EMBODIMENTS

Figure 1:
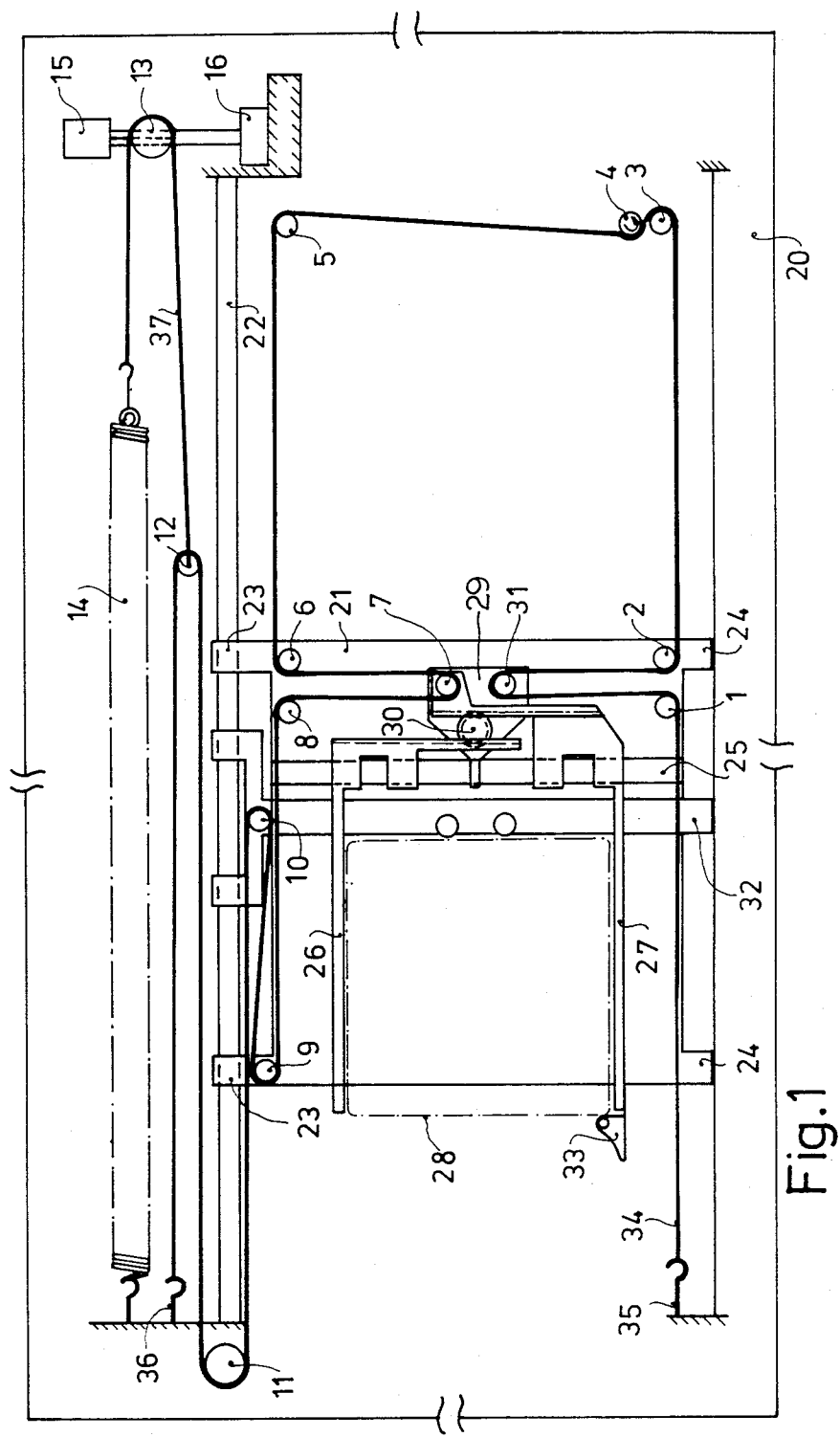
FIG. 1 is a schematic representation of an embodiment of an X-ray spot-film device according to the invention.

In the X-ray spot-film device 20 (FIG. 1), only the contour of which is shown for the sake of clarity, there is arranged a frame-like cassette carriage 21. Cassette carriage is displaceable in the horizontal direction in the plane of drawing. To this end, there is provided a horizontal rail 22 which is enclosed by guide portions 23 on the cassette carriage 21. The lower ends 24 of the cassette carriage are guided so that the cassette carriage 21 cannot be tilted about the rail 22. As a result, the cassette carriage is guided in its plane (the plane of drawing).

The cassette carriage comprises a vertically extending guide member 25. (The term "vertical" refers to the upright position of the X-ray spot-film device or the examination apparatus to which it is connected.) On the guide member 25, there are slidably arranged two sliding members 26 and 27 which extend essentially in the horizontal direction. The spacing between sliding members 26 and 27 is determined by the height of the inserted cassette 28 (i.e. by the vertical dimensions thereof).

A central portion 29 is also slidably arranged between the two sliding members 26 and 27 on the vertical guide member 25. The central portion 29 supports a gearwheel 30. Gear wheel 30 cooperates with vertically extending external teeth on the sliding members 26 and 27 so that the members are movable over the same distance in opposite directions with respect to the central portion 29. On the central portion 29 there is also provided a guide roller 31. A guide roller 7 is also provided at the end of the lower sliding member 27. Sliding members 26 and 27, central portion 29, gear wheel 30, and rollers 7 and 31 form the first sliding fixture.

On the cassette carriage there is also provided a vertically extending sliding member 32. Sliding member 32 guided by the guide rail 22, so that within a given range it can be displaced in the horizontal direction with respect to the cassette carriage. The upper end of the sliding member 32 comprises a roller 10. It locates the cassette 28 in the horizontal direction by pressing it against an abutment 33 on the lower sliding member 27. The position of roller 10 is, therefore, a measure of the width of the cassette. Sliding member 32, roller 10, and abutment 33 form the second sliding fixture.

The cassette format is measured by means of a strap. The strap a rope-like or band-like member, preferably a toothed belt 34. One end of the toothed belt 34 is secured at (point 35 at the bottom left of FIG. 1). The belt 34 is then guided horizontally to a first guide roller 1 on the cassette carriage 21. The toothed belt 34 is subsequently guided vertically about the guide roller 31 on the central portion 29 to a second guide roller 2 on the cassette carriage.

Subsequently, the strap 34 is guided, via rollers 3 and 5 which are provided on the spot-film device (at the bottom right and the top right, respectively, of FIG. 1) to a third guide roller 6 which is second to the top right end of the cassette carriage. The strap 34 is then guided in the vertical direction around the guide roller 7 on the sliding member 27 to a fourth guide roller 8 on the cassette carriage 21. The strap 34 is subsequently horizontally guided, around a fifth guide roller 9 on the cassette carriage 21, around the guide roller 10 on the sliding member 32, around a roller 11 which is connected to the spot-film device, and around an idler roller 12, to a fixed point 36 on the spot-film device. The idler roller 12 is connected, via a toothed belt 37, which is guided about a guide roller 13 on the spot-film device, to a tension spring 14. The other end of spring 14 is connected to the spot-film device.

Via the toothed belt 37 and the idler roller 12, the tension spring tensions the strap 34. At the same time, the sliding members 26, 27 and 32 clamp the cassette 28.

It would, in principle, be possible to alternatively connect the upper end of the strap 34 directly to the tension spring 14. However in that case the tension spring 14 would have to be designed for a stroke which is twice as large.

In addition to the tensioning of the sliding members 26, 27 and 32, the strap 34 also has a further function. A drive motor (not shown) may be arranged at the area of the roller 3. The drive motor acts on the strap 34 via the pinion 4. Using the drive motor, either the strap portion extending around the guide roller 31 can be shortened while the strap portion extending around the guide roller 7 is lengthened by the same amount, or the strap portion extending around the guide roller 7 can be shortened while the strap portion extending around the guide roller 21 is lengthened. As a result of these operations the sliding members 26 and 27 will move either downward or upward. This type of height adjustment is known per se, from U.S. Pat. No. 3,848,134 (corresponding to DE-AS No. 2,226,473).

The essential function of the strap 34, however, is the sensing of the cassette format. Assume that the central portion 29 remains in a central position, (this is always the case when the drive pinion 4 is held at its zero position). Now, when a cassette having a different height is inserted the sliding members 26 and 27 are moved either toward one another or away from one another. The movement of members 26 and 27 causes a corresponding movement of the guide roller 7 in the upward or downward direction. The idler roller 12 via which the strap 34 is tensioned is displaced to the right or to the left, respectively, over the same distance as the roller 7. The distance by which idler roller 12 is moved corresponds to half the difference between the cassette heights. When the cassette 28 is replaced by a cassette having a different width, the sliding member 32 is displaced by an amount corresponding to the full difference, between the widths. The guide roller 10 connected thereto is also moved by the full distance, thus causing a displacement of the idler roller 12 over the same distance, but in the opposite direction. In other words, the effect of the cassette width on the displacement of the idler roller 12 is twice as large as that of the cassette height.

It can be demonstrated that when the customary DIN 6832 cassettes are used in the X-ray spot-film device (13×18 in upright format, 18×24 and 24×30 in upright and in broadside format, and 24×24, 30×30 and 25×35 in sideways format), the idler roller 12 occupies a different position for each cassette. These roller positions are spaced at least 30 mm apart, even when using one and the same cassette which, however, is inserted upright instead of sideways. The different roller positions can be readily sensed from a measuring-technical point of view. Therefore, the different roller positions can be associated with the various cassette formats.

In order to determine the distance of the roller 12 from the end of strap 34 at point 36 (which distance is the value of the measurable dimension of the strap), a potentiometer 15 can be used. The tap of potentiometer 15 is connected to the guide roller 12 by way of the toothed belt 37. The voltage on the potentiometer tap is thus unambiguously determined by the cassette format. This fact can be used to assign a unique cassette format to the individual voltages, as will yet be described.

When the cassette carriage 21 is moved to the right to its parking position (or in the opposite direction) or is moved from this parking position in the opposite direction (to the exposure position), the position of the roller 12 does not change. However, when this displacement is very quick, sagging of the stap portion between individual rollers may occur due to the friction between the strap 34 and the various rollers, thus causing a shift in the value of the measurable dimension and falsification of the evaluation. In order to avoid this phenomenon, there is provided a brake in the form of an electromagnetic coupling 16 which lock the roller 12 during displacement of the cassette carriage 21. Thus, the voltage on the potentiometer tapping 15 does not change during these transitions.

Figure 2:
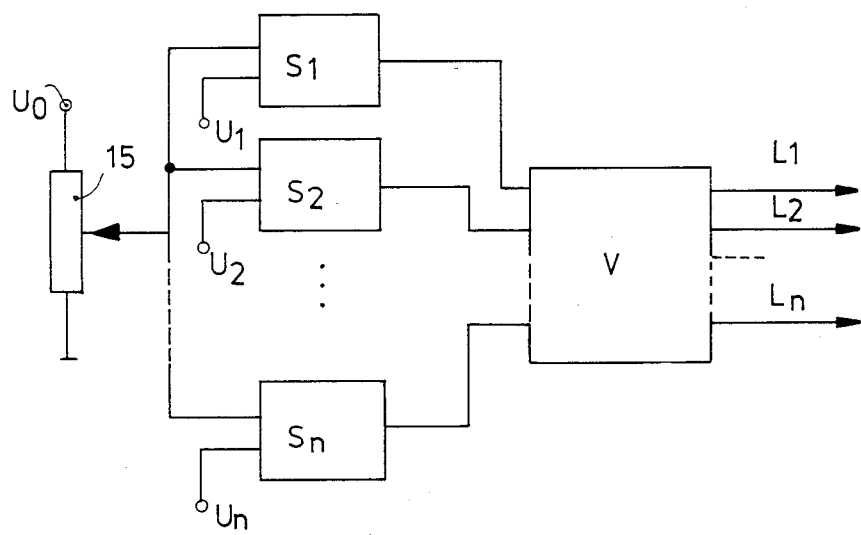
FIG. 2 is a block diagram of a device for detecting the value of the measurable dimension.

FIG. 2 shows a device for sensing the value of the measurable dimension. Potentiometer 15 is connected to a direct voltage $U_0$. The voltage on the tap of the potentiometer 15, is applied to the inputs of threshold value circuits $S_1, S_2 \ldots S_n$. The number of threshold value circuits corresponds to the number of different formats, in order to be compared with the voltages $U_1, U_2 \ldots U_n$ which differ from one another according to the various values of the measurable dimension.

When the voltages $U_1 \ldots U_n$ are chosen to be slightly smaller than the tap voltages corresponding to the n values of the measurable dimension, up to n threshold value circuits are activated. The number of circuits activated depends on the format of the inserted cassette. The binary output signals of the comparison circuits $S_1 \ldots S_n$ are applied to a logic circuit V. Logic circuit V activates, depending on whether 1, 2, ... n threshold value circuits have been activated, one of the output lines $L_1, L_2 \ldots$ or $L_n$. Each output line is associated with one of the formats. The output signals on the lines $L_1 \ldots L_n$ may also be used for conducting two voltages which are proportional to the cassette dimensions (height and width) in order to initiate control steps in the film-spot device.

When the threshold value circuits $S_1 \ldots S_n$ are designed so that they are activated when their input voltage approximately equals a reference value within a predetermined range, and when the reference values for the various threshold value circuits are chosen so that they correspond to only one of the values of the measurable dimension the logic circuit V may be omitted. The lines $L_1 \ldots L_n$ may then be directly connected to the outputs of the threshold value circuits $S_1, S_2 \ldots S_n$, respectively.

What is claimed is:

1. An X-ray spot-film device comprising:
   a cassette carriage;
   a first sliding fixture on the cassette carriage, said first sliding fixture having a variable opening whose size is determined by the height of a cassette placed in the fixture;
   a second sliding fixture on the cassette carriage, said second sliding fixture having a variable opening whose size is determined by the width of a cassette placed in the fixture;
   a strap coupled to the first and second sliding fixtures, said strap having a measurable dimension whose value represents the height and width of a cassette in the first and second sliding fixtures; and
   a detector device for measuring the value of the measurable dimension of the strap;
   characterized in that:
   the strap is a single strap; and
   the strap is coupled to the first and second sliding fixtures such that a unit change in the size of the opening of the first fixture produces a change in the measurable dimension of the strap which is not equal to the change in the measurable dimension of the strap produced by a unit change in the size of the opening of the second fixture.

2. An X-ray spot-film device as claimed in claim 1, characterized in that a unit change in the size of the opening of the first fixture produces a change in the measurable dimension of the strap which is one-half of the change in the measurable dimension of the strap produced by a unit change in the size of the opening of the second fixture.

3. An X-ray spot-film device as claimed in claim 1, characterized in that:
   the first sliding fixture comprises first and second sliding members between which a cassette can be arranged, said members being coupled such that movement of one sliding member in a first direction is accompanied by movement of the other sliding member over an equal distance in the opposite direction, said first sliding member having a guide arranged thereon;
   the second sliding fixture comprises a third sliding member and an abutment between which a cassette can be arranged, said third sliding member having a guide arranged thereon;
   the strap is coupled to the first sliding fixture by being passed around the guide on the first sliding member from a vertical direction; and
   the strap is coupled to the second sliding fixture by being passed around the guide on the second sliding member from a horizontal direction.

4. An X-ray spot-film device as claimed in claim 3, characterized in that the device further comprises:
   a housing;
   a moveable roller; and
   a tension spring having first and second ends, the first end of which is fixed to the housing, the second end of which is attached to the moveable roller;
   and further characterized in that the strap has first and second ends, the first end of which is passed around the moveable roller and is fixed to the housing, the distance between the moveable roller and the first end of the strap being the measurable dimension.

5. An X-ray spot-film device as claimed in claim 4, characterized in that the detector device comprises a potentiometer having a tap, the tap being coupled to the moveable roller.

6. An X-ray spot-film device as claimed in claim 5, characterized in that:
   the potentiometer tap has an output; and the detector device further comprises circuit means connected to the potentiometer tap for converting the potentiometer tap output into a signal representing the height and width of the cassette.

7. An X-ray spot-film device as claimed in claim 6, characterized in that:
the cassette carriage comprises a vertical member;
the first and second sliding members are slideable along the vertical member; and
the device further comprises a motor which acts on the strap to adjust the opening of the first sliding fixture.

8. An X-ray spot-film device as claimed in claim 6, characterized in that:
the cassette carriage is displaceable in the horizontal direction; and
the device further comprises a locking device for locking the detector device during displacement of the cassette carriage.

9. An X-ray spot-film device as claimed in claim 3, characterized in that:
the cassette carriage comprises a vertical member;
the first and second sliding members are slideable along the vertical member; and
the device further comprises a motor which acts on the strap to adjust the opening of the first sliding fixture.

10. An X-ray spot-film device as claimed in claim 3, characterized in that:
the cassette carriage is displaceable in the horizontal direction; and
the device further comprises a locking device for locking the detector device during displacement of the cassette carriage.

11. An X-ray spot-film device as claimed in claim 3, characterized in that:
the strap has first and second ends; and
the device further comprises:
a housing; and
a tension spring having first and second ends, the first end of which is fixed to the housing, the second of which is attached to the first end of the strap, the position of the first end of the strap being the measurable dimension.

12. An X-ray spot-film device as claimed in claim 11, characterized in that the detector device comprises a potentiometer having a tap, the tap being coupled to the first end of the strap.

13. An X-ray spot-film device as claimed in claim 12, characterized in that:
the potentiometer tap has an output; and
the detector device further comprises circuit means connected to the potentiometer tap for converting the potentiometer tap output into a signal representing the height and width of the cassette.

14. An X-ray spot-film device as claimed in claim 13, characterized in that:
the cassette carriage comprises a vertical member;
the first and second sliding members are slideable along the vertical member; and
the device further comprises a motor which acts on the strap to adjust the opening of the first sliding fixture.

15. An X-ray spot-film device as claimed in claim 13, characterized in that:
the cassette carriage is displaceable in the horizontal direction; and
the device further comprises a locking device for locking the detector device during displacement of the cassette carriage.

* * * * *